United States Patent [19]

Allison

[11] 4,293,846

[45] Oct. 6, 1981

[54] REMOTE SELECTIVE SWITCHING SYSTEM FOR USE WITH AC POWER LINE

[75] Inventor: William W. Allison, Huntington Station, N.Y.

[73] Assignee: Pilgrim Electric Company, Plainview, N.Y.

[21] Appl. No.: 69,699

[22] Filed: Aug. 27, 1979

[51] Int. Cl.³ .............................................. H04B 3/54
[52] U.S. Cl. ............................ 340/310 A; 340/168 R; 375/110
[58] Field of Search ........ 340/310 R, 310 A, 310 CP, 340/168 R, 168 B, 147 SY, 151, 163; 307/140, 40; 364/492; 375/21, 25, 37, 94, 110, 117; 455/3-6, 14, 352, 31, 32, 38

[56] References Cited

U.S. PATENT DOCUMENTS

| | | | |
|---|---|---|---|
| 3,967,264 | 6/1976 | Whyte et al. | 340/310 A |
| 4,085,403 | 4/1978 | Meier et al. | 340/168 R |
| 4,114,141 | 9/1978 | Travis | 340/310 A |
| 4,162,486 | 7/1979 | Wyler | 340/310 A |
| 4,173,754 | 11/1979 | Felker | 340/310 A |
| 4,180,803 | 12/1979 | Wesemeyer et al. | 340/310 R |

Primary Examiner—James J. Groody
Attorney, Agent, or Firm—Nolte and Nolte

[57] ABSTRACT

The a-c power distribution system used to energize various loads is also used to carry signals for controlling the operation of such various loads. A control station places an r-f pulse burst on the a-c power line to which is connected the controlled station. Each controlled station is represented by an individual time interval. Individual time intervals are timed at all stations by counters using clock inputs from a common source, such as the a-c power line cycles or from a clock pulse generator. The controlled station receives the first r-f pulse burst and begins counting pulses, either a-c line cycles or separate clock pulses, to time its individual timing interval. If a second r-f pulse burst produced by the controlled station coincides with the controlled station reaching the end of its individual time interval, an actuation signal is produced. The signal actuates a switch which controls energization of the load.

8 Claims, 1 Drawing Figure

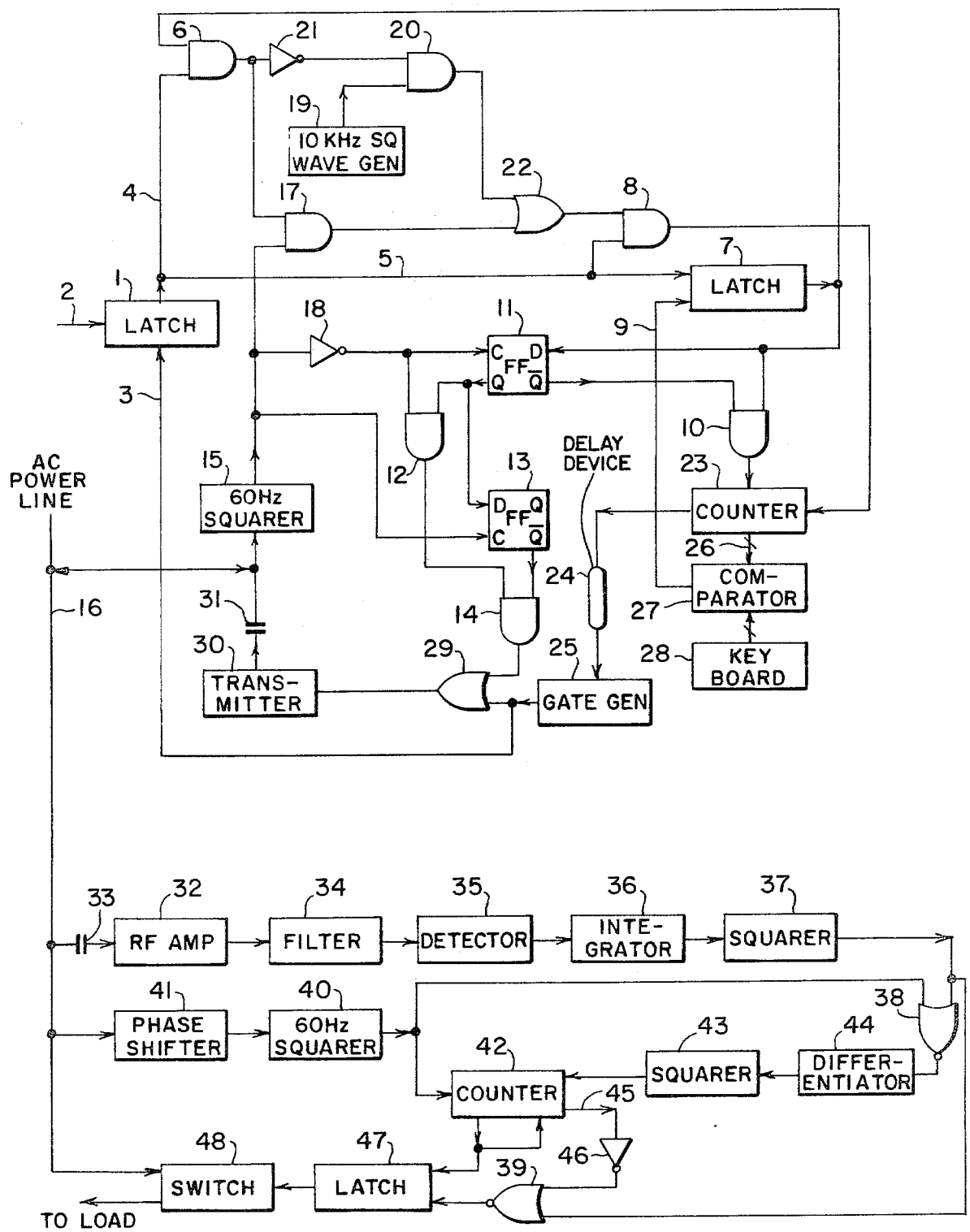

REMOTE SELECTIVE SWITCHING SYSTEM FOR USE WITH AC POWER LINE

FIELD OF THE INVENTION

This invention relates to the field of remote selective switching by radio frequency signals carried on a-c power lines.

SUMMARY OF THE INVENTION

According to this invention, a counter and a numerical entry device at the control station enable a transmitter to transmit two pulses, one when the identity of the selected controlled station is entered, and another when the counter has counted a number of clock cycles determined by the identity of the selected controlled station.

Each controlled station includes a counter arranged to count clock cycles and produce an output when its count reaches a predetermined number that represents its identity. This counter is reset and started upon reception of the first r-f pulse. If the second r-f pulse arrives while the counter is producing an output, the coincidence operates a control device to actuate a switch. If the second pulse does not arrive at this time, that particular controlled station has not been selected.

DRAWING

The single FIGURE of the drawing is a schematic diagram illustrating one control station and one controlled station of a presently preferred embodiment of the invention.

DESCRIPTION

The control, or transmitter station is shown in the upper part of the drawing, and the controlled or receiver station in the lower part.

At the control station, a latch circuit 1 is arranged to be turned on or set by an input pulse on line 2, as may be provided by a manually operable momentary contact switch, for example. The latch may be a conventional device such as a flip-flop, and is turned off, or reset, by an input signal on line 3. While set, the latch produces a positive output voltage on lines 4 and 5, leading respectively to an AND gate 6, and another latch 7 and AND gate 8.

Latch 7 is also a conventional device, designed to require a positive voltage on both input lines 5 and 9 to be set, and to reset in the absence of a positive voltage on line 5. Like latch 1, latch 7 produces a positive output when set, and no output (or negative) when reset. The output of latch 7 goes to AND gate 6 and also to another AND gate 10 and one input of a flip-flop 11.

Flip-flop 11 is of a known type having two input terminals C and D, and two output terminals Q and $\bar{Q}$. When both inputs are positive, $\bar{Q}$ is positive and Q is zero, or negative. When C is positive, Q becomes the same as D, $\bar{Q}$ becomes the opposite.

The $\bar{Q}$ output of flip-flop 11 is applied to AND gate 10. The Q output goes to an AND gate 12 and to the D input of a second flip-flop 13. The Q output of flip-flop 13 is not used; the $\bar{Q}$ output is applied to an AND gate 14.

A wave squarer 15 receives input from the a-c power line 16 and provides a square wave output at line frequency. Squarer 15 may be a Schmitt trigger, for example. The output of squarer 15 goes to the C input of flip-flop 13, an AND gate 17 and an inverter 18 which reverses the phase of the square wave. The output of the inverter 18 goes to the C input of flip-flop 11 and to AND gate 12.

A square wave generator 19 of, for example 10 KHZ, provides an input to gate 20. A second input to gate 20 is supplied by the output of gate 6 through an inverter 21. Gates 17 and 20 provide inputs to an OR gate 22, which in turn provides a second input to AND gate 8, as shown. The output of AND gate 8 is connected to the count input terminal of a counter 23.

Counter 23 is of known type designed to count electrical input pulses and store the total in an internal electronic register. The counter may be stopped by a positive signal from the output of gate 10, and is also arranged to produce an output pulse when the accumulated count reaches some predetermined number N, say 40, greater than the number of controlled stations to be used but generally less than the full capacity of the counter. This output is applied by way of a delay device 24 to a gate pulse generator 25. Device 24 is designed to introduce a delay of 1 millisecond, for example. Gate generator 25 may be a monostable multivibrator, designed to provide an output pulse of about 6 milliseconds duration in response to each input pulse.

Counter 23 is coupled by way of a multiple line 26 to a comparator 27, which also receives input from a keyboard switch set 28. In this example, the keyboard is provided with a separate key for each respective controlled station in the system. The keys may be labelled with the numerical designations of the respective control stations. However, the numerical representation actually supplied to comparator 27 is actually N minus the station number selected. Thus, if N is 40, and key number 24 is pressed, the comparator is set at 16. When the count in counter 23 reaches 16, the comparator produces an output pulse which constitutes one of the set inputs to latch 7.

The outputs of AND gate 14 and gate generator 25 are inputs to an OR gate 29. Any output from gate 29 keys on a radio transmitter 3, which may be adjusted to transmit c-w at some frequency less than 500 KHZ, for example. The output of the transmitter is applied to power line 16 by way of a capacitor 31.

At the controlled station, an r-f amplifier 32 is coupled to the power line 16, which may be a different one from that at the control station, as long as both are parts of the same primary system, by way of a capacitor 33. The output of amplifier 32 goes through an r-f filter 34 to a detector 35. The filter is designed to pass the frequency of transmitter 30 and substantially reject other frequencies. The detector 35 in this case is of a known type that produces a positive output voltage except when an r-f signal is applied to it.

The output of detector 35 goes through an integrator 36 and squarer 37 to NOR gates 38 and 39. A second input to gate 38 is provided by a squarer 40, which receives its input from the power line 16 through an adjustable phase shifter 41. The squarer 40 is also connected to the count input terminal of a counter 42. Counter 42 is adapted to be reset by an output from a squarer 43, which receives its input from NOR gate 38 by way of a differentiating circuit 44.

Counter 42 is adjusted or wired internally so as to provide an output pulse on line 45 when the accumulated count reaches the station number, such as 24. This pulse is applied through an inverter 46 to NOR gate 39. Inverter 46 normally produces a positive voltage output, and produces a negative or zero voltage when it receives an input to NOR gate 39.

Output from gate 39 provides a set input to a latch circuit 47. Counter 42 is arranged to provide an output on line 48 where the count reaches some number, say 90, near its full capacity. This output is a reset input to latch 47 and also a stop input to the counter itself. When set, the latch may actuate a utilization device such as a switch 48 arranged to connect line 16 to a load, not shown. The switch 48 may be of a type such that an output from latch 47 at some subsequent time will cause it to open, or it may include a timer device, or a limit sensor for opening it when the load is to be de-energized.

In the operation of the described system, latch 1 is set by application of a brief pulse to line 2. Gate 6 remains off, i.e. non-conductive, and latch 7 remains in its original reset condition. Gate 20 is enabled by the positive input from inverter 21 to pass the 10 KHZ square wave to OR gate 22, thence to AND gate 8. Gate 8 is enabled by latch 1 to pass the 10 KHZ square wave to counter 23, which simply runs freely at this time, producing no output.

When the key representing the desired controlled station, say number 24, is pressed, the comparator 27 is set at 16. Counter 23 then continues to run until the count returns to 16. The use of the 10 KHZ clock frequency allows the counter to reach the required number even if the selector key is pressed very briefly. The comparator produces an output pulse which sets latch 7. The output of latch 7 energizes the D input of flip-flop 11. During the next subsequent negative excursion of the power line voltage, inverter 18 provides a positive voltage. This voltage actuates flip-flop 11 to produce a positive Q output which, together with that of inverter 18, causes AND gate 12 to produce a positive output.

During the same half cycle, input D of flip-flop 13 is positive and input C is negative causing it to produce a positive voltage at $\overline{Q}$ which, together with the output of gate 12, enables gate 14 to produce a positive output. This output passes OR gate 29, energizing transmitter 30 throughout the negative going power half cycle. At the end of this half cycle, flip-flops 11 and 13 are both actuated to their original state, disabling gates 12 and 14 to de-energize the transmitter and enabling gate 10 to stop the counter 23.

During the next subsequent positive going power cycle, flip-flop 11 is actuated again to de-energize its $\overline{Q}$ terminal, disabling the counter 23 and permitting it to count that half cycle. This action is repeated with each power cycle until the counter reaches a predetermined number, assumed here to be 40.

Since the counter was standing at 16, 40 minus 16 or 24 power line cycles have been counted between the first output pulse from transmitter 30 and the count of 40. At this time, the counter produces an output pulse which, after a brief delay in device 24, triggers gate generator 25. The gate pulse energizes transmitter 30 for about 6 milliseconds, and resets latch 1 which resets latch 7, leaving the equipment in its original state. Note that in this example, 24 full cycles at power line frequency have occurred between the first and second r-f pulses.

The r-f pulses from the transmitter are carried by the power line to all receivers in the system in known manner. Any transformers may be by-passed by small capacitors connected between primary and secondary. Phase shifter 41 at the controlled station is adjusted to make the output of squarer 40 coincident with that of squarer 15 at the control station. This adjustment can also be used to permit the use of different wires of a polyphase system for the transmitter and receiver.

Upon reception of each r-f pulse, detector 35 produces a negative going pulse which is suitably shaped by integrator 36 and squarer 37 for application to NOR gate 38. Since each such pulse occurs during a negative half cycle of the output of squarer 40, it produces a positive output from the NOR circuit 38. This pulse, after shaping by differentiator 44 and squarer 40, resets counter 42 to zero.

The next positive going excursion in the output, and each succeeding one, are counted by counter 42 until the station number, in this case 24, is reached. At that time, the counter produces a positive going output which is inverted by the inverter 46 to provide a negative going input to NOR gate 39. Assuming controlled station 24 has been selected at the control station, the second r-f pulse is received, detected, shaped and applied as a negative pulse to OR gate 39. This gate produces a positive going output which sets latch 47, thereby actuating switch 48. Other controlled stations, assigned other numerical designations, will be unaffected by the second r-f pulse.

Subsequently counter 42 counts on up to 90, producing an output pulse which stops the counter and resets latch 48, thus placing the equipment at the controlled station in its original status.

Although the invention has been described as using the a-c power cycles as clock signals, it is to be understood that any other common clock source may be used, such as a clock signal generator arranged to modulate the transmitter.

What is claimed is:

1. A remote selective system comprising
   (a) means coupled to an a-c power line at a control station for producing and applying to said line two r-f pulse bursts separated by an interval containing a whole number of complete clock cycles, said number designating a controlled station to be selected, said means coupled to an a-c power line including,
   (b) a radio transmitter,
   (c) a control station counter adapted to count clock cycles up to a predetermined number N and then produce an output,
   (d) means for presetting said control station counter to a number equal to N minus said number designating the selected controlled station,
   (e) means for actuating said transmitter to produce a first r-f pulse burst and start said control station counter,
   (f) means responsive to said control station counter output on the count of N for actuating said transmitter to produce a second r-f pulse burst,
   (g) at least one controlled station including r-f receiver means coupled to an a-c power line, said r-f receiver means including,
   (h) controlled station counter means adapted to start counting said clock cycles upon reception of a first r-f pulse burst and to stop counting when the number designating said control station is reached, simultaneously producing an output, and
   (i) means responsive to said counter means output and coincident reception of a second r-f pulse burst to actuate a switch.

2. The apparatus claimed in claim 1, wherein said means (d) for presetting said control station counter incudes
   (j) an intermediate frequency source,
   (k) means for coupling said source as a count input to said control station counter, and
   (l) means for uncoupling said source and stopping said control station counter when the count reaches said number equal to N minus the number designating the selected controlled station.

3. The apparatus claimed in claim 2, wherein said means (k) includes a first latch circuit adapted to be set by a start input, and said means (l) includes a second latch circuit adapted to be set by coincidence of output from said first latch circuit and attainment of said preset number.

4. A remote selective switching system comprising:
   (a) a radio frequency transmitter coupled to an a-c power line at a control station,
   (b) a pulse counter,
   (c) a numerical entry switch means,
   (d) an intermediate frequency source,
   (e) means for coupling said source as counting input to said counter,
   (f) comparator means for producing an output when the count in said counter reaches a number determined by the entry in said entry switch means,
   (g) means responsive to output from said comparator to uncouple said source from said counter and couple said a-c line as input thereto and to enable said transmitter during the next complete negative half cycle of a-c power,
   (h) said counter being arranged to provide an output upon attainment of a predetermined count greater than the maximum that can be entered by said entry switch means,
   (i) means responsive to said counter output to enable said transmitter during the next positive going half cycle of a-c power,
   (j) at least one radio frequency receiver coupled to an a-c power line at a controlled station,
   (k) each such receiver being provided with a counter connected to count a-c power cycles and to produce an output upon attainment of a preset count representing the identification of that particular controlled station,
   (l) means for resetting and starting said counter in response to reception of a signal by said receiver,
   (m) a power switch adapted to connect said a-c line to a load, and
   (n) means responsive to output from said last mentioned counter to close said power switch.

5. The invention set forth in claim 4, further including an adjustable phase shifter connected between said a-c power line and said counter.

6. The invention set forth in claim 4, further including timer means for opening said power switch at the end of a predetermined time interval.

7. The invention set forth in claim 4, wherein said means (n) is adapted to respond to a subsequent output from said last mentioned counter to open said power switch.

8. The method of producing a command signal at a selected one of the plurality of stations from a single control station, comprising the steps of
   (a) assigning each controlled station an individual whole number;
   (b) selecting a controlled station at which the command signal is to be produced,
   (c) applying to an a-c power line at the control station by a radio transmitter first and second r-f pulse bursts separated by an interval containing a whole number of a-c power cycles corresponding to said whole number designating the selected controlled station,
   (d) counting a-c power cycles on a controlled station counter up to a predetermined number N and then producing an output,
   (e) presetting the control station counter to a number equal to N minus said number designating the selected controlled station,
   (f) actuating the transmitter to produce a first r-f pulse burst and the control station counter,
   (g) responding to the control station counter output on the count of N for actuating the transmitter to produce a second r-f pulse burst,
   (h) starting to count a-c power cycles at each controlled station when a first r-f pulse burst is received,
   (i) stopping the counting of a-c power cycles at the selected controlled station when the number designating the selected controlled station is reached, simultaneously producing a signal, and
   (j) producing a command signal at the selected controlled station in response to a coincidence of said last mentioned signal and arrival of said second r-f pulse burst.

* * * * *